(12) United States Patent
Grossman et al.

(10) Patent No.: US 11,919,077 B2
(45) Date of Patent: Mar. 5, 2024

(54) SYSTEMS AND METHODS FOR MANUFACTURING SINTERED METALS

(71) Applicant: Massachusetts Institute of Technology, Cambridge, MA (US)

(72) Inventors: Jeffrey Grossman, Brookline, MA (US); Xining Zang, Cambridge, MA (US); Nicola Ferralis, Cambridge, MA (US); Cuiying Jian, Toronto (CA); Kiera Y. Tai, Cary, NC (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 88 days.

(21) Appl. No.: 17/410,708

(22) Filed: Aug. 24, 2021

(65) Prior Publication Data

US 2022/0055113 A1 Feb. 24, 2022

Related U.S. Application Data

(60) Provisional application No. 63/069,290, filed on Aug. 24, 2020.

(51) Int. Cl.
| | | |
|---|---|---|
| *B22F 10/20* | (2021.01) | |
| *B22F 12/41* | (2021.01) | |
| *B22F 12/53* | (2021.01) | |
| *B33Y 10/00* | (2015.01) | |
| *B33Y 30/00* | (2015.01) | |

(52) U.S. Cl.
CPC .............. *B22F 10/20* (2021.01); *B22F 12/41* (2021.01); *B22F 12/53* (2021.01); *B33Y 10/00* (2014.12); *B33Y 30/00* (2014.12)

(58) Field of Classification Search
CPC .......... B22F 10/00; B22F 10/10; B22F 10/20; B22F 12/53; B22F 12/55; B22F 12/50; B22F 12/58; B33Y 10/00
See application file for complete search history.

(56) References Cited

U.S. PATENT DOCUMENTS 4,235,603 A * 11/1980 Miller ....................... C10L 5/04
44/550
9,944,526 B2   4/2018 Troester et al.
(Continued)

OTHER PUBLICATIONS

Lee ("Lasers in additive manufacturing: A review." International Journal of Precision Engineering and Manufacturing-Green Technology 4 (2017): 307-322.) (Year: 2017).*

(Continued)

*Primary Examiner* — Ricardo D Morales
(74) *Attorney, Agent, or Firm* — Barnes & Thornburg LLP

(57) ABSTRACT

Systems and methods for manufacturing sintered materials are disclosed. Metal nano- and microparticles can be sintered to form thin films. The metals are sintered in the presence of a binder such as a tar, e.g., steam cracker tar (SCT), which has strong absorbing and antioxidant properties that allow the metal particles to retain heat. Retention of heat by the binder can allow the sintering to occur at ambient temperatures. In some embodiments, the mixture and/or the resulting films can be used in additive manufacturing processes to build various components from the layers of thin film manufactured from the presently disclosed methods.

20 Claims, 3 Drawing Sheets

(56) References Cited

U.S. PATENT DOCUMENTS

| | | | |
|---|---|---|---|
| 2004/0081573 A1* | 4/2004 | Newell | B22F 3/26 419/10 |
| 2016/0325464 A1* | 11/2016 | Albers | B33Y 10/00 |
| 2016/0332919 A1* | 11/2016 | Fryska | C04B 35/521 |
| 2018/0162048 A1* | 6/2018 | Gibson | C09D 123/12 |
| 2019/0381692 A1 | 12/2019 | Johannes | |

OTHER PUBLICATIONS

Thakur et al. ("Printing with 3D continuous carbon fiber multifunctional composites via UV-assisted coextrusion deposition." Manufacturing letters 24 (2020): 1-5.) (Year: 2020).*

Shou, Wan, et al. ("Low-cost manufacturing of bioresorbable conductors by evaporation-condensation-mediated laser printing and sintering of Zn nanoparticles." Advanced Materials 29.26 (2017): 1700172.) (Year: 2017).*

Kershaw et al. ("Structural characterization of coal-tar and petroleum pitches." Energy & fuels 7.3 (1993): 420-425.) (Year: 1993).*

Frazier et al., "Metal Additive Manufacturing: A Review," Journal of Materials Engineering and Performance, 23(6), 2014.

Gu et al., "Effects of dispersion technique and component ratio on densification and microstructure of multi-component Cu-based metal powder in direct laser sintering," Journal of Materials Processing Technology, 182, pp. 564-573, 2007.

Jian et al., "Structural Evolutions of Small Aromatic Mixtures under Extreme Temperature Conditions: Insights from ReaxFF Molecular Dynamics Investigations," Carbon N.Y, 155, 309-319, 2019.

Kresse et al., "From Ultrasoft Pseudopotentials to the Projector Augmented-Wave Method," Phys. Rev. B, 59, 1758-1775, 1999.

Kresse et al., Efficiency of Ab-Initio Total Energy Calculations for Metals and Semiconductors Using a Plane-Wave Basis Set, Comput. Mater. Sci., 6, 15-50, 1996.

Kumar, "Selective Laser Sintering: A Qualitative and Objective Approach," Literature Review: Modeling and Characterization, JOM 2003.

Lee et al., "Lasers in Additive Manufacturing: A Review," International Journal of Precision Engineering and Manufacturing-Green Technology, 2007.

Perdew et al., "Generalized Gradient Approximation Made Simple," Phys Rev. Lett., 77, 3865-3868, 1996.

Shou et al., "Low-Cost Manufacturing of Bioresorbable Conductors by Evaporation-Condensation-Mediated Laser Printing and Sintering of Zn Nanoparticles," Adv. Mater., 29, 2017.

Zang et al., "Laser-Induced Tar-Mediated Sintering of Metals and Refractory Carbides in Air," American Chemical Society, ACS Nano, 2020.

Zang et al., "Laser-sculptured ultrathin transition metal carbide layers for energy storage and energy harvesting applications," Nature Communications, 2019.

* cited by examiner

SYSTEMS AND METHODS FOR MANUFACTURING SINTERED METALS

CROSS REFERENCE TO RELATED APPLICATIONS

The present disclosure claims priority to and the benefit of U.S. Provisional Application No. 63/069,290, entitled "Systems and Methods for Manufacturing Sintered Metals," filed on Aug. 24, 2020, and which is incorporated by reference herein in its entirety.

FIELD

The present disclosure relates to processes for forming sintered materials, conductive films, and the films and resulting devices and systems that result from the same, and more particularly relates to processes for manufacturing sintered thin films of various metals using a low power laser and in the presence of a heavy hydrocarbon binder. The resulting sintered films can then be used in additive manufacturing processes.

BACKGROUND

Refractory metals and their carbides possess high chemical and temperature resilience and exception mechanical strength that are utilized in variety of fields, such as aerospace, biomedical engineering, and power plants. Examples of such refractory metals, such as molybdenum and tungsten carbide, have been widely applied in machine tools and armor-piercing shells and their alloys have been used in parts of aeronautical engines, including nozzles and turbine blades. Incorporation of these metals and carbides into these products has proven to be time-consuming and expensive, with alternative production methods being heavily researched in the industry.

Use of refractory metals in additive manufacturing has several shortcomings. First, refractory metals can be difficult to engineer due to their high melting temperatures. These high melting temperatures make the inclusion of these refractory metals cumbersome as processing of these refractory metals require high temperatures. Conventional approaches to manufacturing these materials generally use a high-energy laser or electron beam, as well as ventilation designed to protect the metal powder from combustion. Second, while laser annealing has been shown to provide low-cost versatile thermal processing methods with broad material compatibility and spatial resolution, incorporation of the products of these techniques in state-of-the-art additive manufacturing methods such as selective laser melting (SLM) and electron beam melting (EBM) has been shown to require relatively high laser power, e.g., on the order of several kilowatts, while operating under vacuum or inert gas. Direct additive manufacturing of ceramics and refractory, high entropy alloys is generally difficult due to their high melting temperatures and the challenge of controlling phase transformation during the thermal processes. Moreover, sintering of metal microparticles into metal and metal carbide thin films in air can form oxides, which can have deleterious effects on the articles that are additively manufactured.

Accordingly, there is a need for systems and methods for low-energy engineering of refractory materials for use in additive manufacturing processes that are cost-effective.

SUMMARY

The present application is directed to systems and methods for producing sintered materials, e.g., sintered metals. Metal nano- and microparticles can be sintered to form films or substrates that have high electrical conductivity. In at least some instances, the metals are sintered in the presence of a binder such as a tar, e.g., steam cracker tar (SCT), which has strong absorbing and antioxidant properties that allow the metal particles to retain heat. For example, particles of the binder can be mixed with the metal nano- and microparticles of the metal to form a mixture that is then exposed to a sintering source. During sintering, the metals can be exposed to a low power laser that is absorbed by the tar. The sintering can occur at ambient temperatures due to the ability of the binder to retain heat therein. In some embodiments, the mixture and/or the resulting films can be used in additive manufacturing processes to build various components from the layers of thin film manufactured from the presently disclosed methods. The terms additive manufacturing and 3D-printing may be used herein interchangeably.

Some non-limiting examples of metal nano- and microparticles that can be used in presently disclosed processes includes Al, Cu, Ni, and refractory Mo and W, among others. A thin layer of carbon segregates on aluminum and copper sintered films surface due to its low solubility in these metals, while nickel with higher carbon solubility provides a clean surface after laser annealing. Refractory metals (molybdenum and tungsten) which are laser sintered in air, result in different high energy transition metal carbide phases through optimized control over laser power and rastering speed.

The resulting sintered materials can be used in additive manufacturing to build various components. In some embodiments, the mixture can be extruded through a three-dimensional printer and sintered via an irradiation source, e.g., a laser, to form a layer of film or a thin film. For example, the processes provided for utilize steps of applying and/or depositing a first layer of the mixture onto the substrate, irradiating the mixture to form a sintered material, applying and/or depositing a second layer of the same, or a different, mixture and irradiating the mixture to form a sintered material, and repeating the sequence of layering the sintered materials to form a multi-layered object. As described herein, various parameters associated with the mixture, the material, the irradiation source, and the processing steps can be adjusted to produce desirable results for the sintered material, among other properties of the material that can be controlled via the disclosed processes.

The processed material has a wide variety of potential applications. These include, by way of non-limiting examples, use in biomedical devices, high energy power plants, aerospace engines, and hypersonic applications.

In one exemplary embodiment of a method for producing a sintered material, the method includes contacting one or more microparticles of a material with a binder to form a first mixture, and exposing the one or more microparticles to an energy source under conditions sufficient to cause sintering of the mixture to form a sintered material.

The sintering can be carried out at ambient temperature. The energy source can be a $CO_2$ laser. The energy source can be a low-power laser. The energy source can be a power output that is less than or equal to approximately 2 W. The material can include metal. The material can include one or more of Al, Co, Ni, Mo, or W. In some embodiments, the material is a thin film. In some embodiments, the binder can include one or more of tar, SCT, mesophase pitch, or asphaltene.

The method can further include ejecting the first mixture from a nozzle onto a surface, ejecting a second mixture from the nozzle towards the surface, the second mixture being either the same or different from the first mixture, and repeating the steps of ejecting the first mixture and the second mixture in layers to form an object. Exposing the one or more microparticles to the energy source occurs immediately after ejecting the first mixture or the second mixture. In some embodiments, ejecting one of the first mixture and the second mixture and exposing the one or more microparticles to the energy source occurs substantially simultaneously.

In one exemplary embodiment of a system for printing in three dimensions, the system can include a printhead, one or more nozzles, an extruder, and an irradiation source. The printhead is configured to move in one or more degrees of freedom. The one or more nozzles are configured to eject a first mixture, with the first mixture including a binder and a metal. The extruder passes through at least a portion of one nozzle of the one or more nozzles and is configured to deliver the first mixture to a print location disposed distal of the one or more nozzles. The irradiation source moves in tandem with the printhead to sinter the ejected mixture into a sintered metal material.

The first mixture can include one or more of metal nano- or microparticles or binder. The irradiation source can be a low-power laser. The irradiation source can include a power output that is approximately 2 W or less. The irradiation source can be a $CO_2$ laser.

In some embodiments, the binder can include one or more of tar, SCT, mesophase pitch, or asphaltene. The metal can include one or more of Al, Co, Ni, Mo or W. The sintered metal material can be a thin film.

The system can further include a fluid heater configured to heat the one or more nozzles to heat the first mixture disposed therein prior to such mixture being ejected from the respective one or more nozzles. In some embodiments, the system can further include a controller that includes a feedback loop that is configured to minimize any errors pertaining to an amount of mixture that is ejected from the one or more nozzles.

BRIEF DESCRIPTION OF THE DRAWINGS

This disclosure will be more fully understood from the following detailed description taken in conjunction with the accompanying drawings, in which.

DESCRIPTION

Figures 1A, 1B:
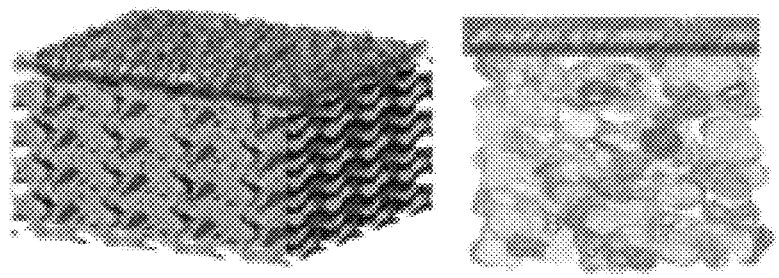
FIG. 1A is a perspective view of a metal with low carbon solubility having a carbon precipitate formed thereon after laser sintering.
FIG. 1B is a side view of the metal with low carbon solubility of FIG. 1A having the carbon precipitate formed thereon.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, compositions, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent that the instant disclosure includes various terms for components and/or processes of the disclosed devices, systems, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, the mixture is described as being deposited or applied onto a substrate to produce a film. Such deposition can occur by one or more of ink jetting, thermal spray, cold spray, sol-gel coating, slurry coating, spray-drying, spin coating, or drop coating, among others. A person skilled in the art, however, in view of the present disclosures will understand other ways and compositions by which the sintered metals can be formed.

The present disclosure generally relates to systems and processes for manufacturing a sintered metal material into films, e.g., thin films. To produce the sintered metals, one or more metals can be exposed to a laser to form films. Some non-limiting examples of metals can include aluminum, copper, nickel, molybdenum, and tungsten, among others. The metals can be exposed to a low powered laser under ambient conditions. Conventionally, while refractory metals such as molybdenum, tungsten, and their carbides possess extraordinary chemical and thermal resilience and mechanical strength, they are difficult to engineer due to their high melting temperature and their uncontrollable phase transformation during thermal processes, which does not allow them to be used in additive manufacturing. Mixing the metals with a binder can increase the workability of the metals, allowing for direct patterning and laser sintering of metal microparticles into metal and metal carbide thin films in air without formation of oxides. The impact of the binder on the metals is discussed in greater detail herein.

At least one novel aspect of the present disclosure lies in the inclusion of the binder during the sintering process. Using tar as a binder in metal sintering processes can allow metal sintering to be carried out using low-power lasers and/or at ambient temperature. For example, the one or more metals can be mixed with a heavy hydrocarbon binder prior to exposure to the laser for sintering. One exemplary embodiment of a binder is steam cracker tar (SCT). The SCT can be used as both a light absorber and antioxidant binder to sinter thin films of aluminum, copper, nickel, molybdenum, and tungsten powder, among others. SCT may include both virgin (unprocessed) and processed streams, which are often waste material (e.g., material such as steam cracker tar that results from ethane or hydrocarbon processing). SCT is an ultra-low-cost petroleum processing byproduct that is used as the absorbing and antioxidant binder for its strong $CO_2$ laser absorption and solvent-friendly chemical and rheological compatibility with metals exhibited by SCT can allow the metals to be sintered at ambient temperatures via exposure to a low-powered laser, which would routinely not be possible without the use of high-powered laser sources or high temperatures in the sintering process. Use of SCT as a binder can provide for a low-energy, cost-effective route for engineering refractory materials, and one that can easily be extended to additive manufacturing processes.

SCT has an adaptable viscosity, as well as strong absorption around 10 μm due, at least in part, to the C—C vibration in polycyclic aromatic hydrocarbon (PAH), which allows it to facilitate the direct patterning and laser sintering of metal microparticles into metal and metal carbide thin films in air without formation of oxides. Using tar as a light absorber and antioxidant enables direct sintering in air with a low power (approximately <about 2 W) $CO_2$ laser, rather than at the temperatures used in bulk annealing above melting temperatures. Moreover, with the assistance of an absorbing binder the input energy can be about two orders of magnitude smaller than what is required in other metal printing methods such as selective laser melting (SLM) and electron beam melting (EBM). Without using tar in the metal thin film, the low power down to about 1 W cannot trigger any photon-induced thermal reactions. Moreover, due to the laser-induced metal sintering processes of the present disclosure operating under ambient conditions, the ability to avoid ventilation and pumping can decrease the processing time and complexity compared to SLM and EBL.

In some embodiments, the SCT can be added to the metal to enhance the properties of the metals for additive manufacturing. A person skilled in the art will recognize that SCT, like other tars, is malleable and can be readily deposited. As a result, adding SCT to a mixture of particles can cause the mixture to become processable, e.g., via ink jetting, and so forth. When applying laser power to the tar, it can also act as a strong light absorber due to its dark color being able to transfer energy efficiently into heat.

Other materials can be used in lieu of, or in addition to, SCT as a binder. In some embodiments, polyaromatic carbonaceous hydrocarbons with strong absorption of $CO_2$ laser such as tar, mesophase pitch, and asphaltene can be used. Aromatic binders, and specifically hydrocarbons such as tar, pitch, mesophase pitch, and asphaltene can enable the formation of nano-cavities acting like black-bodies under laser irradiation. As discussed herein, any organic compound with at least three to four aromatic rings (which have low volatility upon ablation and high affinity to interconnect with other molecules) may be suitable for acting as the required precursor for the formation of a nanocavity. Unlike polymers, for which the laser would ablate away the polymer without leaving any aromatic graphitic structure leading to the formation of nano-cavities, the presence of the heavy hydrocarbons enhances the effect of absorption of energy from the laser. With heavy hydrocarbons, the aromatics seed the formation of larger aromatic graphitic structures upon laser ablation (e.g., by merging and/or interconnecting). Enhanced broadband light absorption through carbon nano-cavities (e.g., a forest of nanotubes) can be observed. Some additional examples of binders can include, pitch, crude, asphaltene or crude oil, and/or heavy oil. It will be appreciated that binders having darker colors can be more effective as binders due to darker colors typically being a manifestation of high light absorption compared to lighter colors.

The structural conformation of sintered metal-tar thin films depends on at least two factors: the carbon solid solubility in the given metal and the formation energy of the corresponding metal carbide. In some embodiments, the metals that can be used with the processes of the present disclosure can include Al, Cu, Ni, Mo and W, though it will be appreciated that these are non-limiting examples of metals. A person skilled in the art will recognize that metals with high carbon solubility can lead to a smooth surface after sintering, while refractory metals such as molybdenum and tungsten form carbides, as described in greater detail below.

Figures 2A, 2B:
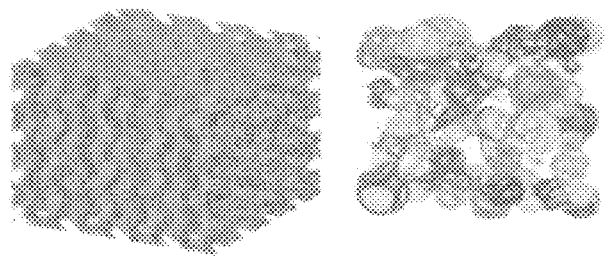
FIG. 2A is a perspective view of a metal with high carbon solubility forming a carbide after laser sintering.
FIG. 2B is a side view of the metal with high carbon solubility of FIG. 2A having the carbide formed thereon.

FIGS. 1A and 1B illustrate carbon segregation on metals with low carbon solubility after laser sintering. For example, among metals used within the scope of the present disclosure, aluminum has both a relatively low melting temperature (~600 degrees Celsius) and low solid carbon solubility (0.015 wt. %). Copper possesses a very low carbon solid solubility that has been exploited to control the growth of monolayer graphene by chemical vapor deposition. As shown, carbon can precipitate on the surface of these metals to form a layer of carbon that is separate from the metal beneath. By contrast, FIGS. 2A and 2B illustrate metals with high carbon solubility having a smooth surface after sintering. As shown, phase segregation of carbon on the metal surface is not observed in laser annealed patterns, which can be attributed to the high carbon solubility in such metals. For example, Ni has high carbon solubility and strong chemisorption binding with carbon atoms. Molybdenum and tungsten, which form carbide phases of Mo—C and W—C when sintered, have clean surfaces and values of formation energy of their respective carbides that are even lower than melting Mo and W in the presence of carbon, as described in greater detail below. While aluminum, copper, nickel, molybdenum, and tungsten powder are discussed herein, a person skilled in the art will recognize that other metals, such as iron powder, chromium powder, titanium powder, as well as other materials, such as Ti—W powder mixture for alloy manufacturing, carbides, such as titanium carbide (TiC), chromium carbide (Cr), zinc carbide (ZnC), or vanadium carbide (VC), and ceramics, among others, can be used with the presently disclosed processes.

In some embodiments, as a result of optimizing laser parameters and metal powder size distribution, laser-treated metal/tar thin films can produce metal phases (in the case of Al, Cu, Ni) and metal carbide phases (in the case of Mo, W) with low sheet resistance, in some cases as low as $10^{-1}$ ohm/sq. For example, the presently disclosed processes can be used to create films of sintered Al/Cu/Ni metals, as well as thin films of mixed phases, such as molybdenum and tungsten, which can form carbide phases as discussed above. Refractory metals such as molybdenum, tungsten, and their carbides possess excellent chemical and thermal resilience and mechanical strength. One exemplary embodiment of such a film can include a laser sintered porous copper with a stable response to large strain (approximately 3.0) after approximately 150 cycles, and a laser processed $Mo/MoC_{(1-x)}$ filament that reaches T-1000 degrees Celsius in open air at approximately 12 V. A person skilled in the art will recognize that besides the crystallographic characterization of laser sintered metal/tar mixtures by X-ray diffraction (XRD), electrical conductivities of sintered films can be used, for example, to validate the formation of metallic or carbide phases in refractory metals.

Sintering the metals can be performed using a variety of heat sources. In some embodiments, the sintering can be performed by an irradiation or energy source, such as a laser, set at a varying power. For example, in some embodiments, a low-power laser, e.g., approximately <about 2 W, can be used. Some non-limiting examples of lasers that can be used in the methods of the presently disclosed embodiments can include a $CO_2$ laser, CW laser, solid state laser, nanosecond or femtosecond laser, and/or microwave radiation, among others.

Unlike conventional methods for sintering metals and/or metal carbide materials, which utilize high-powered laser sources or high temperatures in the sintering process, the sintering process of the presently disclosed embodiments can be performed using a low-powered laser and can be performed under ambient conditions. The absorbing properties of the binder during sintering of the metal nano- and microparticles can allow more heat to be retained within the particles such that the sintering can be performed at lower temperatures than conventional processes. Moreover, with the assistance of an absorbing binder, the input energy is at least approximately two orders of magnitude smaller than what is required in other metal printing methods such as selective laser melting (SLM) and electron beam melting (EBM). Without using tar in the metal thin film, the low power down to approximately 1 W cannot trigger any photon-induced thermal reactions. Since the laser-induced metal sintering method here proposed operates under ambient conditions, the saving of ventilation and pumping can decrease the processing time and complexity compared to SLM and EBL. Direct laser printing in air through a compact laser source can reduce the processing overhead imposed by the otherwise required control over the buffer gas during annealing and instrumentational complexity in the case of EBM. Such factors can potentially reduce the complexity of fabricating metal and metal-carbide films in continuous "roll-to-roll" manufacturing.

The mixture can be deposited onto a substrate and then sintered. A person skilled in the art will recognize that rather than heating an entire substrate on which the sintered materials are deposited, the laser can be selectively applied to portions of the substrate to sinter specific areas thereof. By selectively sintering specific portions of the substrate, portions of the substrate that would normally melt under conventional processes can be retained, thereby enabling reuse of the substrate and/or sintering metals with specific designs thereon. Some non-limiting examples of sintered materials that can be produced with the presently disclosed methods can include films, thin films, wires, whiskers, blades, ribbons, or coatings. It will be appreciated that sintering and deposition of materials can occur substantially simultaneously, e.g., as part of a three-dimensional printer, as discussed in greater detail below.

In an alternate embodiment, after the binder-metal mixture is deposited onto the substrate and sintered, the unprocessed binder can be washed out using a solution. Some non-limiting examples of a solvent that can be used with the presently disclosed embodiments can include Dichloromethane and N-Methyl-2-pyrrolidone, among others.

The sintered thin films of the presently disclosed embodiments can be used in additive manufacturing of various components. In some embodiments, the thin films can be layered on top of one another to build and/or manufacture components for use in industry. For example, after formation of the laser sintered thin films of aluminum, copper, nickel, molybdenum, and/or tungsten powder, as described above, the films can be stacked or otherwise arranged in a manner recognized by a person skilled in the art to three-dimensionally print components.

Figure 3:
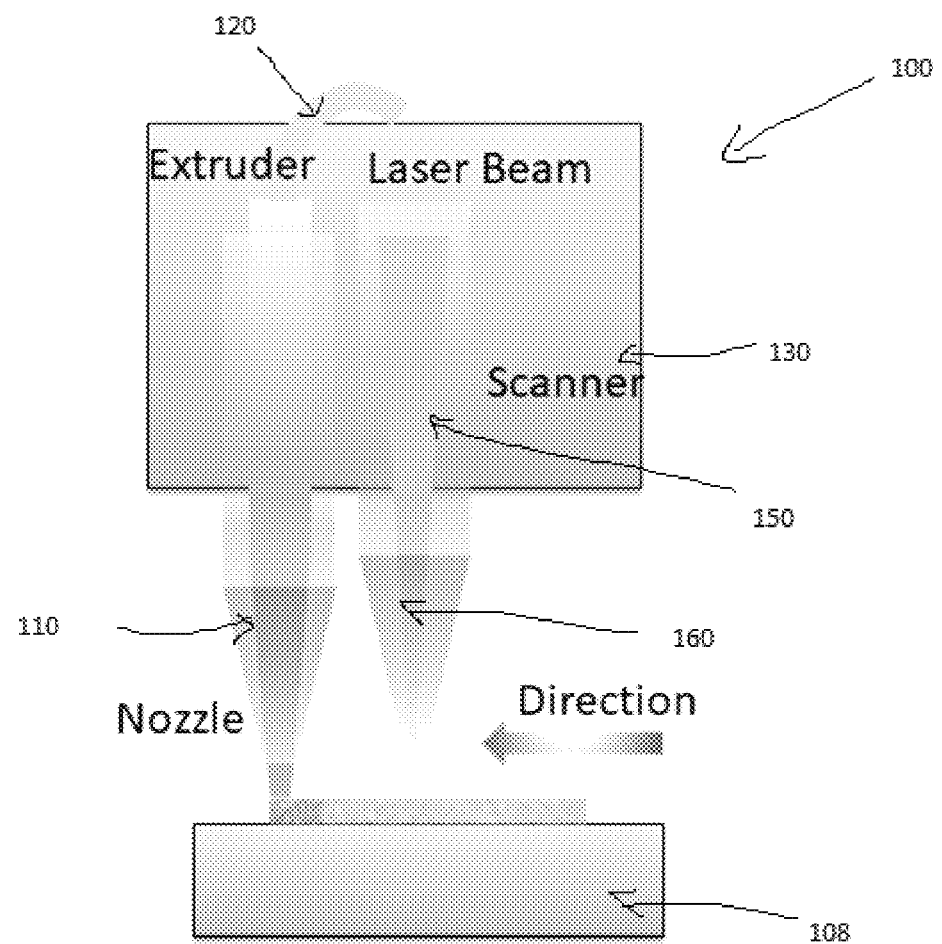
FIG. 3 is schematic illustration of a three-dimensional printing system set-up for additive manufacturing that is within the scope of the present disclosure.

FIG. 3 provides one exemplary embodiment of a three-dimensional printing system or printer 100 set-up for additive manufacturing. As shown, the manufacturing system 100 can include a three-dimensional printing device or printer 100 set-up for printing in an x-y coordinate plane. The printer 100 can dispense fluid in a controlled manner to create two-dimensional patterns in multiple layers, thereby producing a 3D part. The illustrated embodiment includes a nozzle 110 for deposition of materials used in the printing process, but a person skilled in the art will recognize that various other means of depositing materials onto a printing surface can be used. In some embodiments, the printer 100 can include an extruder 120 that is connected to a pressure controller (not shown) to regulate the pressure at which extruded substances are deposited. The materials that are deposited by the extruder 120 through the nozzle 110 can be deposited layer-by-layer, e.g., a layer of nickel followed by a layer of copper, and so forth, in an additive manufacturing process.

The nozzle 110 can be attached to one or more printheads or scanners 130 in this modified version of the 3D printer, which can be a modification of a bench model printer. It will be appreciated that many different 3D printers and nozzles, or similarly capable components, can be used in conjunction with the present disclosures. Components of a printer 100 can include, but are not limited to, one or more drivers to advance the one or more printheads 130 on which one or more nozzles 110 can be disposed, as well as a controller to control and/or operate, among other things, a print path along which the printhead(s) are moved and/or components of the printer that help control the rate at which a solvent released by the syringe 120 evaporates or extrudate is ejected from the nozzles 110. Additional information about materials that can be used in conjunction with the printing devices, systems, and methods provided for in the present disclosure, including various deposition materials, solvents, adhesives, and materials to wash away materials that provided adhesive forces following deposition, are provided below, as well as throughout the present disclosure and those disclosures incorporated herewith.

Various chambers for housing materials to be printed can also be part of the printer. The printer 100 is able to move across an x-y plane to deposit material onto a surface. The movement of the printer 100 in the x-y plane is a capability of 3D printers, and thus a description of how it is able to move in the x-y plane is unnecessary since it is understood by those skilled in the art. Many different ways by which movement in the x-y plane can be achieved are contemplated by the present disclosure, and typically such movements can be utilized in conjunction with the present teachings.

Moreover, in view of the present disclosures, the printer 100 can print onto a more contoured surface at least because the disclosures provided for herein allow the printed materials to conform to the surfaces onto which they are printed. It will be appreciated that because 3D printing necessarily results in an object having three dimensions, and because the present disclosures relate to additive manufacturing, printing also occurs onto material that has already been deposited, such as filament, fluids, gels, inks, or other materials previously deposited by the printer 100 and/or other material otherwise disposed on the surface and/or the previously deposited material.

The repeated deposition of the layers as discussed above can be used to form multi-layer thin films. For example, the modified printer can include replacing the standard printhead with a pneumatic extruder. In such embodiments, the extruder can be modified to adjust for the viscosity of the mixture that travels via the extruder through the nozzle for deposition onto the build platform. In some embodiments, the printer 100 can include a controller that includes a feedback loop that is configured to minimize any errors pertaining to an amount of mixture that is ejected from the one or more nozzles 110.

In some embodiments, the modified printer can include one or more light sources or irradiating sources 150 attached thereto. The irradiating sources 150 can be used as a part of the sintering process to produce sintered metal and/or metal carbide materials. As shown, the irradiating source 150 can include a laser beam 160 that is built into, or otherwise incorporated into, a larger structure for sintering metals to produce the sintered materials discussed herein. For example, in some embodiments, the laser can be embedded into the scanner 130 such that the laser 160 moves with the scanner. As mentioned above, in some embodiments, sintering and deposition of materials can occur substantially simultaneously. For example, as shown, as the printhead 130 moves in the direction indicated, the nozzle 110 can deposit the mixture while the irradiating source follows the printhead to sinter the mixture that has been deposited. It will be appreciated that the nozzle 110 and the irradiating source 150 can continuously be switched on such that the mixture that is deposited is immediately irradiated, though in some embodiments, one or more of the nozzle 110 and the irradiating source 150 can be selectively toggled between on and off positions to create patterns of sintered metal.

The surface upon which the deposited materials can be printed can be any surface. In the illustrated embodiment, a surface or build platform 108 is substantially flat, and thus has its own x-y plane. In some embodiments, the extruder 130 is attached to a numerically controlled three-axis stage which can move in all six degrees of freedom to facilitate deposition of the mixture onto the surface 108 to print the 3D structure. As shown, the printhead 130 can move in a direction relative to the build platform 108 such that the nozzle 110 deposits the mixture and the irradiation source 150 follows thereafter to sinter the mixture to form the thin film. A person skilled in the art will recognize that a z-height of the printhead 130 can also be adjusted, thus allowing the printer 100 to print in three dimensions. Alternatively, or additionally, the build platform 108 can be moved along the z-axis to provide for printing in three dimensions. In some instances, the build platform 108 can have six degrees of freedom, permitting additional ways by which the location onto which the materials being deposited can be manipulated. A person skilled in the art understands how a 3D printer is able to move in a third plane, and across six degrees of freedom, to adjust a location of one or more nozzles 110 of the printhead 130, and thus further explanation is not provided herein.

The sintered materials resulting from the present disclosure can serve as the foundation of various objects. Either separately, or as part of an overall manufacturing process, the sintered metals, and the thin films created therefrom, can be incorporated into a variety of processes to reduce overall manufacturing costs and duration. By way of non-limiting examples, such thin films can be incorporated into applications in biomedical devices, high energy power plants, aerospace engines, hypersonic application, and so forth. Moreover, refractory metals such as molybdenum, tungsten, and/or their carbides, possess extraordinary chemical and thermal resilience and mechanical strength. For example, tungsten and molybdenum carbide can be widely applied in machine tools and armor-piercing shells, and their alloys can be applied in parts of aeronautical engines including nozzles and turbine blades.

Figure 4:
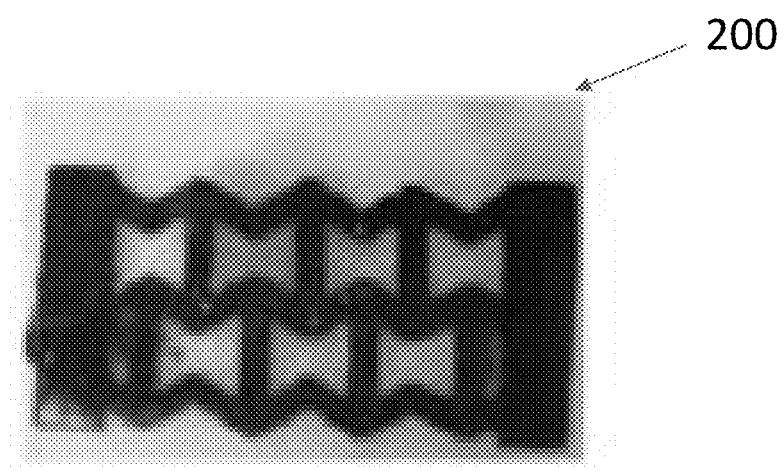
FIG. 4 is a perspective top view of an exemplary embodiment of a strain sensor fabricated using the techniques of the present disclosure.

FIG. 4 illustrates an exemplary embodiment of a strain sensor 200 fabricated through patterning via the optimized laser parameters and annealing techniques described above. As shown, laser-sintered patterns can be transferred onto flexible substrates to fabricate stretchable electronic devices such as the strain sensor. Testing of such sensors has shown a linear response with applied strain of up to 0.15, with a gauge factor of ~20, suggesting that the elasticity limit of the strain sensor is much higher than that of copper metal. In some embodiments, laser printed Mo/MoC$_x$ Joule heating filaments can also be fabricated with a sheet resistance below 1.6 ohm/sq., leading to an operational maximum temperature over 1,000 degrees Celsius in the open air with an input power of approximately 12 volts. Moreover, the techniques disclosed herein allow for use of input energies that can be approximately two or more orders of magnitude smaller than those used in other metal printing methods such as SLM or EBM.

One skilled in the art will appreciate further features and advantages of the disclosures based on the provided for descriptions and embodiments. Accordingly, the present disclosure is not to be limited by what has been particularly shown and described. To the extent the present disclosure includes illustrations and descriptions that include prototypes, bench models, or schematic illustrations of set-ups, a person skilled in the art will recognize how to rely upon the present disclosure to integrate the techniques, systems, devices, and methods provided for into a product and/or production method, such as a consumer-ready, factory-ready, or lab-ready additive manufacturing printer. All publications and references cited herein are expressly incorporated herein by reference in their entirety.

Examples of the above-described embodiments can include the following:

1. A method for producing a sintered material, comprising:
   contacting one or more microparticles of a material with a binder to form a first mixture; and
   exposing the one or more microparticles to an energy source under conditions sufficient to cause sintering of the mixture to form a sintered material.
2. The method of claim 1, wherein the sintering is carried out at ambient temperature.
3. The method of any of claim 1 or claim 2, wherein the energy source is a $CO_2$ laser.
4. The method of any of claims 1 to 3, wherein the energy source is a low-power laser.
5. The method of any of claims 1 to 4, wherein the energy source has a power output that is less than or equal to approximately 2 W.
6. The method of any of claims 1 to 5, wherein the material comprises one or more of Al, Co, Ni, Mo, or W.
7. The method of any of claims 1 to 6, wherein the sintered material is a thin film.
8. The method of any of claims 1 to 7, wherein the binder includes one or more of tar, SCT, mesophase pitch, or asphaltene.
9. The method of any of claims 1 to 8, further comprising:
   ejecting the first mixture from a nozzle onto a surface;
   ejecting a second mixture from the nozzle towards the surface, the second mixture being either the same or different from the first mixture; and
   repeating the steps of ejecting the first mixture and the second mixture in layers to form an object.
10. The method of claim 9, wherein exposing the one or more microparticles to the energy source occurs immediately after ejecting the first mixture or the second mixture.
11. The method of any of claim 9 or claim 10, wherein ejecting one of the first mixture and the second mixture and exposing the one or more microparticles to the energy source occurs substantially simultaneously.
12. A system for printing in three dimensions, comprising:

a printhead configured to move in one or more degrees of freedom;

one or more nozzles configured to eject a first mixture, the first mixture comprising a binder and a metal;

an extruder passing through at least a portion of one nozzle of the one or more nozzles, the extruder configured to deliver the first mixture to a print location disposed distal of the one or more nozzles; and an irradiation source that moves in tandem with the printhead to sinter the ejected mixture into a sintered metal material.

13. The system of claim 12, wherein the first mixture includes one or more of metal nano- or microparticles or binder.

14. The system of claim 12 or claim 13, wherein the irradiation source is a low-power laser having a power output that is approximately 2 W or less.

15. The system of any of claims 12 to 14, wherein the irradiation source is a $CO_2$ laser.

16. The system of any of claims 12 to 15, wherein the binder includes one or more of tar, SCT, mesophase pitch, or asphaltene.

17. The system of any of claims 12 to 16, wherein the metal comprises one or more of Al, Co, Ni, Mo or W.

18. The system of any of claims 12 to 17, wherein the sintered metal material is a thin film.

19. The system of any of claims 12 to 18, further comprising a fluid heater configured to heat the one or more nozzles to heat the first mixture disposed therein prior to such mixture being ejected from the respective one or more nozzles.

20. The system of any of claims 12 to 19, further comprising a controller that includes a feedback loop that is configured to minimize any errors pertaining to an amount of mixture that is ejected from the one or more nozzles.

Some non-limiting claims that are supported by the contents of the present disclosure are provided below.

What is claimed is:

1. A method for producing a sintered material, comprising:

contacting one or more microparticles of a material with a binder to form a first mixture; and exposing the one or more microparticles to an energy source under conditions sufficient to cause sintering of the mixture to form a sintered material having at least a portion of the binder therein, wherein the binder includes one or more of tar, SCT, mesophase pitch, or asphaltene, wherein the sintering is carried out at ambient temperature; and wherein the sintered material is formed without forming oxides.

2. The method of claim 1, wherein the energy source is a $CO_2$ laser.

3. The method of claim 1, wherein the energy source is a low-power laser.

4. The method of claim 1, wherein the energy source has a power output that is less than or equal to approximately 2 W.

5. The method of claim 1, wherein the material comprises one or more of Al, Co, Ni, Mo, or W.

6. The method of claim 1, wherein the sintered material is a thin film.

7. The method of claim 1, further comprising:

ejecting the first mixture from a nozzle onto a surface;

ejecting a second mixture from the nozzle towards the surface, the second mixture being either the same or different from the first mixture; and repeating the steps of ejecting the first mixture and the second mixture in layers to form an object.

8. The method of claim 7, wherein exposing the one or more microparticles to the energy source occurs immediately after ejecting the first mixture or the second mixture.

9. The method of claim 7, wherein ejecting one of the first mixture and the second mixture and exposing the one or more microparticles to the energy source occurs substantially simultaneously.

10. The method of claim 1, wherein the binder comprises an organic compound with at least three to four aromatic rings.

11. The method of claim 1, wherein an input energy of the energy source is at least approximately two orders of magnitude smaller than an energy used in selective laser melting (SLM) and electron beam melting (EBM).

12. The method of claim 1, wherein the energy source is selectively applied to a specific area of a surface onto which the mixture is deposited.

13. The method of claim 1, further comprising washing an amount of unprocessed binder using a solution.

14. The method of claim 13, wherein the solution further comprises one of dichloromethane and N-Methyl-2-pyrrolidone.

15. The method of claim 1, wherein the binder is devoid of polymers.

16. A method for producing a sintered material, comprising:

contacting one or more microparticles of a material with a binder to form a mixture; and exposing the one or more microparticles to an energy source under conditions sufficient to cause sintering of the mixture to form a sintered material, wherein an input energy of the energy source is at least approximately two orders of magnitude smaller than an energy used in selective laser melting (SLM) and electron beam melting (EBM), wherein sintering of the mixture forms nano-cavities acting like black-bodies when exposed to the energy source.

17. The method of claim 16, wherein the sintering is carried out at ambient temperature.

18. The method of claim 1, wherein the material comprises one or more of Mo or W.

19. The method of claim 1, wherein sintering of the first mixture forms nano-cavities acting like black-bodies when exposed to the energy source.

20. The method of claim 16, wherein the material comprises one or more of Mo or W.

* * * * *